(12) United States Patent  
Saito

(10) Patent No.: US 8,779,343 B2  
(45) Date of Patent: Jul. 15, 2014

(54) SOLID STATE IMAGE PICKUP DEVICE HAVING AN ANALOG SIGNAL PROCESSING UNIT INCLUDING FIRST AND SECOND CAPACITORS, A DELAY CIRCUIT AND AN A/D CONVERTING CIRCUIT FOR AN IMAGE CAPTURING SIGNAL PROCESS

(75) Inventor: Masashi Saito, Tokyo (JP)

(73) Assignee: Olympus Corporation, Tokyo (JP)

( * ) Notice: Subject to any disclaimer, the term of this patent is extended or adjusted under 35 U.S.C. 154(b) by 253 days.

(21) Appl. No.: 13/347,794

(22) Filed: Jan. 11, 2012

(65) Prior Publication Data

US 2012/0175500 A1 Jul. 12, 2012

(30) Foreign Application Priority Data

Jan. 11, 2011 (JP) ................. 2011-002949

(51) Int. Cl.
*H01L 27/10* (2006.01)
*G01J 1/46* (2006.01)

(52) U.S. Cl.
USPC .................................. 250/208.1; 250/214 R

(58) Field of Classification Search
USPC .............. 250/208.1, 214 R; 348/302–311
See application file for complete search history.

(56) References Cited

U.S. PATENT DOCUMENTS 7,151,475 B2 * 12/2006 Boemler ................. 341/155
2009/0303361 A1 * 12/2009 Saito et al. ............. 348/294

FOREIGN PATENT DOCUMENTS

JP 2005-347932 A 12/2005
JP 2010-141685 A 6/2010

\* cited by examiner

*Primary Examiner* — Georgia Y Epps
*Assistant Examiner* — Carolynn A Moore
(74) *Attorney, Agent, or Firm* — Westerman, Hattori, Daniels & Adrian, LLP

(57) ABSTRACT

A solid state image pickup device may include a pixel unit that includes a photoelectric conversion element, the pixel unit including a plurality of pixels that are arranged in a form of a two-dimensional matrix in the pixel unit, each of the plurality of pixels outputting a reset signal and a pixel signal, an analog signal processing unit that includes a first capacitor and a second capacitor, a delay circuit that includes a plurality of delay elements that are connected in a ring form, an A/D converter that detects the number of stages in which the pulse signal has propagated through the delay elements in the delay circuit during a sampling time period and generates a digital signal based on the detected number of stages, and a switching circuit that switches a connection of the first capacitor.

6 Claims, 10 Drawing Sheets

AMOUNT
OF
INCIDENT LIGHT

DIGITAL VALUE

(12)  United States Patent
US 8,779,343 B2

SOLID STATE IMAGE PICKUP DEVICE HAVING AN ANALOG SIGNAL PROCESSING UNIT INCLUDING FIRST AND SECOND CAPACITORS, A DELAY CIRCUIT AND AN A/D CONVERTING CIRCUIT FOR AN IMAGE CAPTURING SIGNAL PROCESS

BACKGROUND OF THE INVENTION

1. Field of the Invention

The present invention relates to a solid state image pickup device including an analog-to-digital (A/D) converting circuit used for an image capturing signal process of a digital camera, a camcorder, an endoscope, or the like.

Priority is claimed on Japanese Patent Application No. 2011-002949, filed Jan. 11, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, solid state image pickup devices such as charge coupled devices (CCDs) image sensor and complementary metal-oxide semiconductor (CMOS) image sensors have been mounted in image pickup devices such as digital cameras, camcorders, endoscopes, and the like. The image pickup devices are commonly used both domestically and abroad, and demands for a further reduction in the size of the image pickup device and low power consumption are increasing.

In order to meet the demands for the size reduction and low power consumption of the solid state image pickup device, for example, Japanese Unexamined Patent Application, First Publication No. 2005-347932 discloses a solid state image pickup device including a plurality of correlated double sampling (CDS) circuits and a plurality of A/D converters. In the solid state image pickup device disclosed in Japanese Unexamined Patent Application, First Publication No. 2005-347932, the CDS circuit and the A/D converter are arranged for each column of pixels arranged in the form of a two-dimensional matrix. Each of the A/D converters receives a voltage output from pixels (hereinafter referred to as a "pixel signal") via the CDS circuit. The A/D converter obtains a digital image signal having a high signal to noise ratio (SNR) by performing A/D conversion on the input pixel signal.

As the A/D converter mounted in the solid state image pickup device, an A/D converter of a time to digital converter (TDC) type configured by a digital circuit may be used. The A/D converter of the TDC type (hereinafter referred to as an "A/D converting circuit") outputs a digital image signal A/D-converted from an input pixel signal by outputting a pulse having a frequency corresponding to the input pixel signal and counting the pulse with a counter.

FIG. 7 is a block diagram illustrating a schematic configuration of an A/D converting circuit (an A/D converter of a TDC type). The A/D converting circuit illustrated in FIG. 7 includes a delay circuit 11, a counter 12, a latch circuit 13, and a latch/encoder circuit 14.

The latch circuit 11 includes a plurality of delay elements (one delay element AND1 and a plurality of delay elements DU1 in FIG. 7), which are connected in a ring form. A pixel signal, which is to be subjected to A/D conversion, is input to each of the delay elements in the delay circuit 11 as an input signal Vin. Each of the delay elements in the delay circuit 11 delays an input pulse ϕPL by a delay time according to a voltage difference between a signal level of the input signal Vin and a ground (GND) level using the input signal Vin as a power voltage. Then, the delay circuit 11 generates a pulse signal ϕCK having a frequency corresponding to the delay time of each delay element.

The counter 12 counts the pulse signal ϕCK generated by the delay circuit 11, that is, a circulation number in which the input pulse ϕPL has circulated the delay circuit 11, and outputs the count result as a digital signal ϕD1. The latch circuit 13 stores (latches) the digital signal ϕD1 output from the counter 12, and outputs the latched digital signal as a digital signal ϕD2. The latch/encoder circuit 14 receives outputs of the delay elements in the delay circuit 11, detects a passing stage number of the delay elements of the delay circuit 11 through which the input pulse ϕPL has passed, that is, position information of the pulse signal ϕCK inside the delay circuit 11, and outputs the detection result as a digital signal ϕD3.

The A/D converting circuit outputs a digital signal ϕD4 corresponding to the signal level of the input signal Vin, that is, the pixel signal, which includes the digital signal ϕD2 output from the latch circuit 13 as data of a high-order bit and the digital signal ϕD3 output from the latch/encoder circuit 14 as data of a low-order bit. The digital signal ϕD4 serves as a digital image signal (digital value) A/D-converted by the A/D converting circuit.

Here, a description will be made in connection with a solid state image pickup device in which the A/D converting circuit illustrated in FIG. 7 is arranged for each column of pixels arranged in the form of a two-dimensional matrix. FIG. 8 is a block diagram illustrating a schematic configuration of a solid state image pickup device in which an A/D converting circuit (an A/D converter of a TDC type) is arranged for each column of pixels. The solid state image pickup device illustrated in FIG. 8 includes a pixel unit 1 including a plurality of pixels 2 arranged in the form of a matrix, a signal processing unit 3, a vertical driving unit 7, a horizontal driving unit 8, and a control circuit 9. The signal processing unit 3 includes a plurality of CDS circuits 51 to 54 and a plurality of A/D converting circuits 41 to 44.

The A/D converting circuits 41 to 44 include delay circuits 411 to 441 and pulse passing stage number detecting circuits 412 to 442, respectively. Each of the delay circuits 411 to 441 arranged in the A/D converting circuits 41 to 44 has the same configuration as the delay circuit 11 arranged in the A/D converting circuit illustrated in FIG. 7. Each of the pulse passing stage number detecting circuits 412 to 442 includes a circuit having a configuration in which the counter 12, the latch circuit 13, and the latch/encoder circuit 14 of the A/D converting circuit illustrated in FIG. 7 are combined.

When the A/D converting circuit is arranged for each column of the pixel unit as in the solid state image pickup device illustrated in FIG. 8, for example, several hundred to several thousand A/D converting circuits are arranged in a narrow range having a width of several micrometers (µm). In this case, when a GND line is arranged for each A/D converting circuit, an area of the GND line increases. Thus, a common GND line is connected to all of the A/D converting circuits 41 to 44 as in the solid state image pickup device illustrated in FIG. 8. Lines for pixel signals input to the A/D converting circuits 41 to 44 are also arranged to pass through the narrow range having a width of several micrometers (µm).

As described above, the A/D converting circuit outputs the digital signal ϕD4 corresponding to the circulation number of the input pulse ϕPL, which circulates during the delay time corresponding to the voltage difference between the signal level of the pixel signal (the input signal Vin) and the GND level, and the passing stage number of the delay element. For this reason, an operation current of the A/D converting circuit changes depending on the signal level of the input signal Vin or impedance of a line. The operation current of the A/D converting circuit also varies in terms of time according to a status in which the input pulse φPL is passing through the plurality of delay elements (the delay element AND1 and the delay elements DU1).

More specifically, a current It1 flowing through the GND line of the delay circuit 411 arranged in the A/D converting circuit 41, a current It2 flowing through the GND line of the delay circuit 421 arranged in the A/D converting circuit 42, a current It3 flowing through the GND line of the delay circuit 431 arranged in the A/D converting circuit 43, and a current It4 flowing through the GND line of the delay circuit 441 arranged in the A/D converting circuit 44 change depending on the signal levels of the input signals input to the delay circuits 411 to 441 and operation statuses of a plurality of delay elements according to the passing of the input pulse φPL. As described above, the current flowing through the GND line connected in common to all columns changes depending on the signal level of the input signal of each row, that is, the signal level of the pixel signal.

A current I1 flowing through an input line from the CDS circuit 51 to the delay circuit 411, a current I2 flowing through an input line from the CDS circuit 52 to the delay circuit 421, a current I3 flowing through an input line from the CDS circuit 53 to the delay circuit 431, and a current I4 flowing through an input line from the CDS circuit 54 to the delay circuit 441 change depending on the signal levels of the input signals input to the delay circuits 411 to 441 and operation statuses of a plurality of delay elements according to the passing of the input pulse φPL.

Due to the change in the current, a voltage of a voltage drop by resistive components of the input lines and the GND line of the A/D converting circuits 41 to 44 changes, and voltage levels of the input and the GND of the delay circuits 441 to 441 change. Due to the change in the input and GND voltages of the delay circuits 411 to 441 and the GND, even though input signals having the same delay time in the delay circuit (for example, the same input signal Vin) are A/D-converted, the A/D converted digital signals φD4 output from the A/D converting circuits 41 to 44 change according to signal levels of pixel signals simultaneously read out and output from pixels 2 of different columns arranged in the same row in the pixel unit 1. For this reason, as illustrated in FIGS. 9A and 9B, the pixels 2 in the pixel unit 1 differ in a digital image signal (a digital value).

FIGS. 9A and 9B are diagrams schematically illustrating an example in which the digital values output from the A/D converters of the TDC type (the A/D converting circuits 41 to 44) vary according to the pixel 2. FIG. 9A is a diagram schematically illustrating an amount of light incident to the pixels 2 arranged in the form of a 4-by-4 matrix in the pixel unit 1. FIG. 9B is a diagram schematically illustrating levels of digital values obtained by A/D converting the pixel signals, corresponding to the amount of incident light, output from the pixels 2 through the A/D converting circuits corresponding to the respective pixel columns. In the following description, the position of each pixel 2 is represented by inputting digits indicating the row number and the column number of the pixel unit 1 to "( ): parentheses" added behind the symbol of the pixel 2. A first digit in "( ): parentheses" represents a row number, and a second digit represents a column number. For example, a pixel 2 at a second row and a third column is represented by a pixel $2_{(2,3)}$.

FIG. 9A illustrates an aspect in which, as the color of each pixel 2 changes from black to white, the amount of light incident to the pixel 2 increases. FIG. 9B illustrates an aspect in which, as the color corresponding to each pixel 2 changes from black to white, the digital value A/D converted from the pixel signal output from each pixel 2 increases. That is, black represents a status in which the amount of light incident to the pixel 2 is small and the digital value is small, whereas white represents a status in which the amount of light incident to the pixel 2 is large and the digital value is large, FIG. 9A illustrates a case in which the amount of incident light has two statuses. More specifically, FIG. 9A shows a state in which a pixel $2_{(1,1)}$, a pixel $2_{(1,2)}$, a pixel $2_{(1,3)}$, a pixel $2_{(2,2)}$, a pixel $2_{(2,3)}$, and a pixel $2_{(3,3)}$ are large in the amount of incident light, whereas a pixel $2_{(1,4)}$, a pixel $2_{(2,1)}$, a pixel $2_{(2,4)}$, a pixel $2_{(3,1)}$, a pixel $2_{(3,2)}$, a pixel $2_{(3,4)}$, a pixel $2_{(4,1)}$, a pixel $2_{(4,2)}$, a pixel $2_{(4,3)}$, and a pixel $2_{(4,4)}$ are small in the amount of incident light.

When the A/D converting circuits corresponding to the respective pixel columns have the same operation current, the digital values having the same tendency as in FIG. 9A are expected to be output. However, actually, the A/D converted digital values have values of different levels due to the change in the operation current of the A/D converting circuit as illustrated in FIG. 9B. For example, as illustrated in FIG. 9A, the pixel $2_{(3,1)}$ and the pixel $2_{(3,2)}$ have the same amount of incident light, however, the digital value corresponding to the pixel $2_{(3,1)}$ is different from the digital value corresponding to the pixel $2_{(3,2)}$.

As described above, even when the pixels 2 are the same in the amount of incident light and outputs the pixel signals of the same signal level, the levels of the A/D converted digital values change by the signal levels of the pixel signals output from the pixels 2 of different columns arranged in the same row in the pixel unit 1.

In order to cope with the change in the voltage levels of the input and the GND of the delay circuit, Japanese Unexamined Patent Application, First Publication No. 2010-141685 discloses the following technique. In an A/D converting circuit disclosed in Japanese Unexamined Patent Application, First Publication No. 2010-141685, an input signal Vin is first input to a buffer, and a capacitor is connected between an output signal line of the buffer and a GND signal line as illustrated in FIG. 10. An output of the buffer is supplied to delay elements of a delay circuit as a power voltage. This configuration is the same as a configuration in which a bypass capacitor is arranged between the signal line of the input signal Vin and the GND signal line. In a technique disclosed in Japanese Unexamined Patent Application, First Publication No. 2005-347932, the above configuration is employed to suppress a change in voltage levels of the input signal Vin and the GND of the A/D converting circuit.

However, generally, a circuit area necessary for implementing a capacitor in a digital circuit of a CMOS type is very large compared to other digital circuits (for example, the delay element DU1). Thus, a circuit area of the A/D converting circuit having the configuration, illustrated in FIG. 10, disclosed in Japanese Unexamined Patent Application, First Publication No. 2005-347932 also increases. For this reason, when the A/D converting circuit having the configuration disclosed in Japanese Unexamined Patent Application, First Publication No. 2005-347932 is employed as is and mounted for each column of the pixel unit in the solid state image pickup device in which the A/D converting circuit is arranged for each column of the pixel unit as disclosed in Japanese Unexamined Patent Application, First Publication No. 2010-141685, the circuit area of the solid state image pickup device increases, and the size of the solid state image pickup device increases. In particular, in recent solid state image pickup devices, the number of pixels tends to increase. However, if the number of A/D converting circuits mounted for each column of the pixel unit increases with the increase in the number of pixels, it will be difficult to implement the solid state image pickup device in which the A/D converting circuits are mounted.

SUMMARY

The present invention provides a solid state image pickup device capable of reducing a change in voltage levels of an input and a GND caused by an operation of an A/D converting circuit of each column and reducing a change (error) in digital value output from the A/D converting circuit provided for each column, without increasing the size of a solid state image pickup device, even when the A/D converting circuit is mounted for each column.

A solid state image pickup device may include: a pixel unit that includes a photoelectric conversion element, the pixel unit including a plurality of pixels that are arranged in a form of a two-dimensional matrix in the pixel unit, each of the plurality of pixels outputting a reset signal, which is output when the photoelectric conversion element is reset, and a pixel signal that corresponds to an amount of light incident to the photoelectric conversion element; an analog signal processing unit that includes a first capacitor and a second capacitor, the reset signal and the pixel signal being sequentially input to the first capacitor from one predetermined pixel among the plurality of pixels during an analog signal processing time period, the second capacitor storing a difference between the pixel signal and the reset signal, the analog signal processing unit outputting a differential signal corresponding to the difference between the pixel signal and the reset signal; a delay circuit that includes a plurality of delay elements that are connected in a ring form, each of the plurality of delay elements delaying a pulse signal by a delay time corresponding to a level of the differential signal output from the analog signal processing unit; an A/D converter that detects the number of stages in which the pulse signal has propagated through the delay elements in the delay circuit during a sampling time period, the A/D converter generating a digital signal based on the detected number of stages; and a switching circuit that switches a connection of the first capacitor to cause the first capacitor to be connected between the one predetermined pixel and the second capacitor during the analog signal processing time period so that the reset signal and the pixel signal are sequentially input from the one predetermined pixel to the first capacitor and the difference between the pixel signal and the reset signal input to the first capacitor is input to the second capacitor, and to cause the first capacitor to be connected to a power supply terminal of each of the plurality of delay elements in the delay circuit during the sampling time period. The analog signal processing unit, the delay circuit, the A/D converter, and the switching circuit may be arranged for every one predetermined column or every a plurality of predetermined columns of the pixel unit. Each pixel of the one predetermined column or the plurality of predetermined columns in the pixel unit may output the reset signal and the pixel signal to the corresponding one analog signal processing unit.

The switching circuit may switch a connection of terminals of the first capacitor, so that a high potential side terminal among the power supply terminals of the plurality of delay elements is connected to a high potential side terminal of the terminals of the first capacitor, and a low potential side terminal among the power supply terminals of the plurality of delay elements is connected to a low potential side terminal of the terminals of the first capacitor.

The switching circuit may connect the high potential side terminal of the first capacitor to a predetermined reference power voltage before the sampling time period starts. The switching circuit may cause the potential of the predetermined reference power voltage to be stored in the first capacitor before the sampling time period.

The predetermined reference power voltage may be a reference power voltage supplied to the analog signal processing unit.

According to the present invention, it is possible to reduce a change in voltage levels of an input and a GND caused by an operation of an A/D converting circuit of each column and to reduce a change (error) in digital value output from the A/D converting circuit provided for each column, without increasing the size of the solid state image pickup device, even when the A/D converting circuit is mounted for each column.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
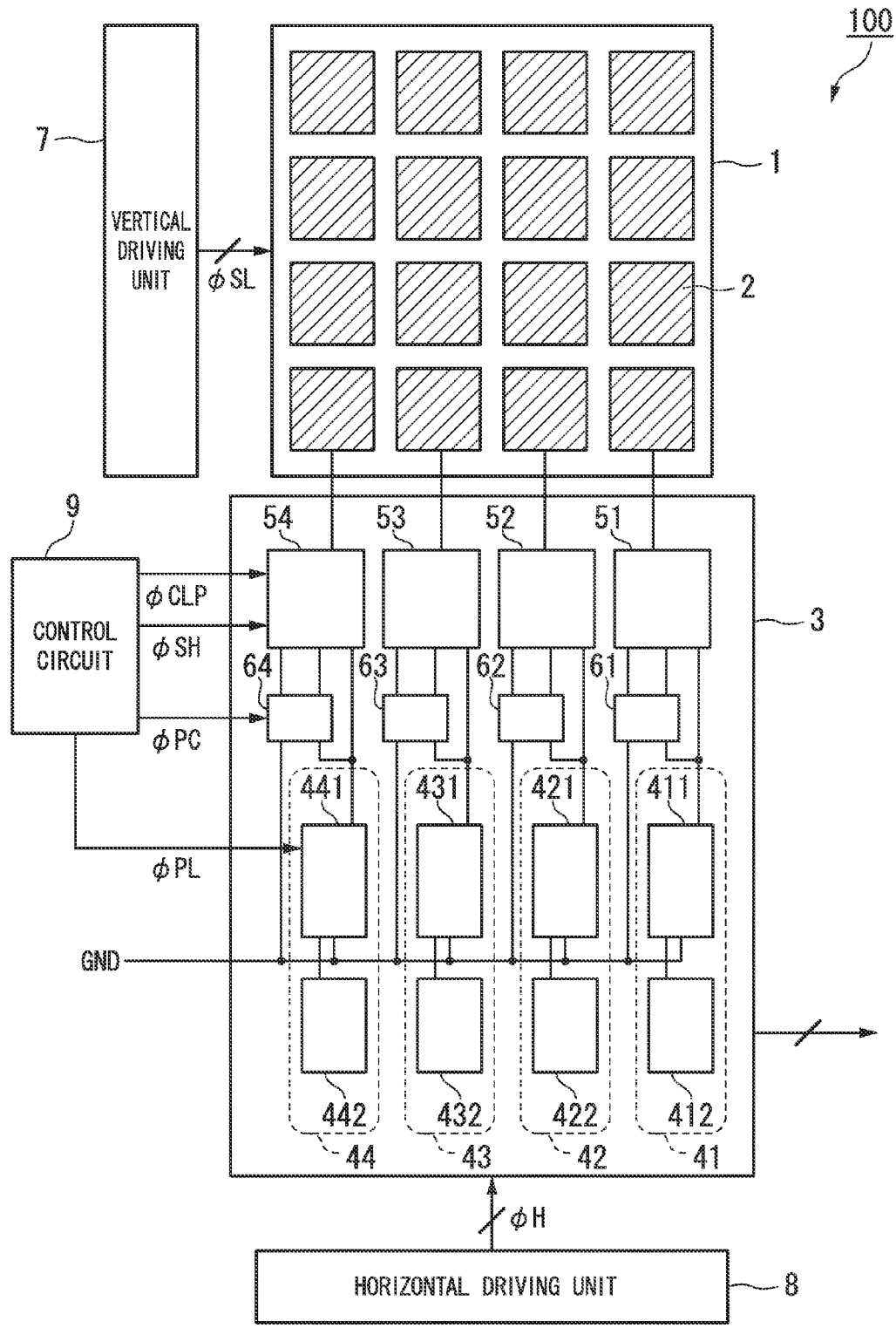
FIG. 1 is a block diagram illustrating a schematic configuration of a solid state image pickup device in accordance with a first preferred embodiment of the present invention.
Figure 8:
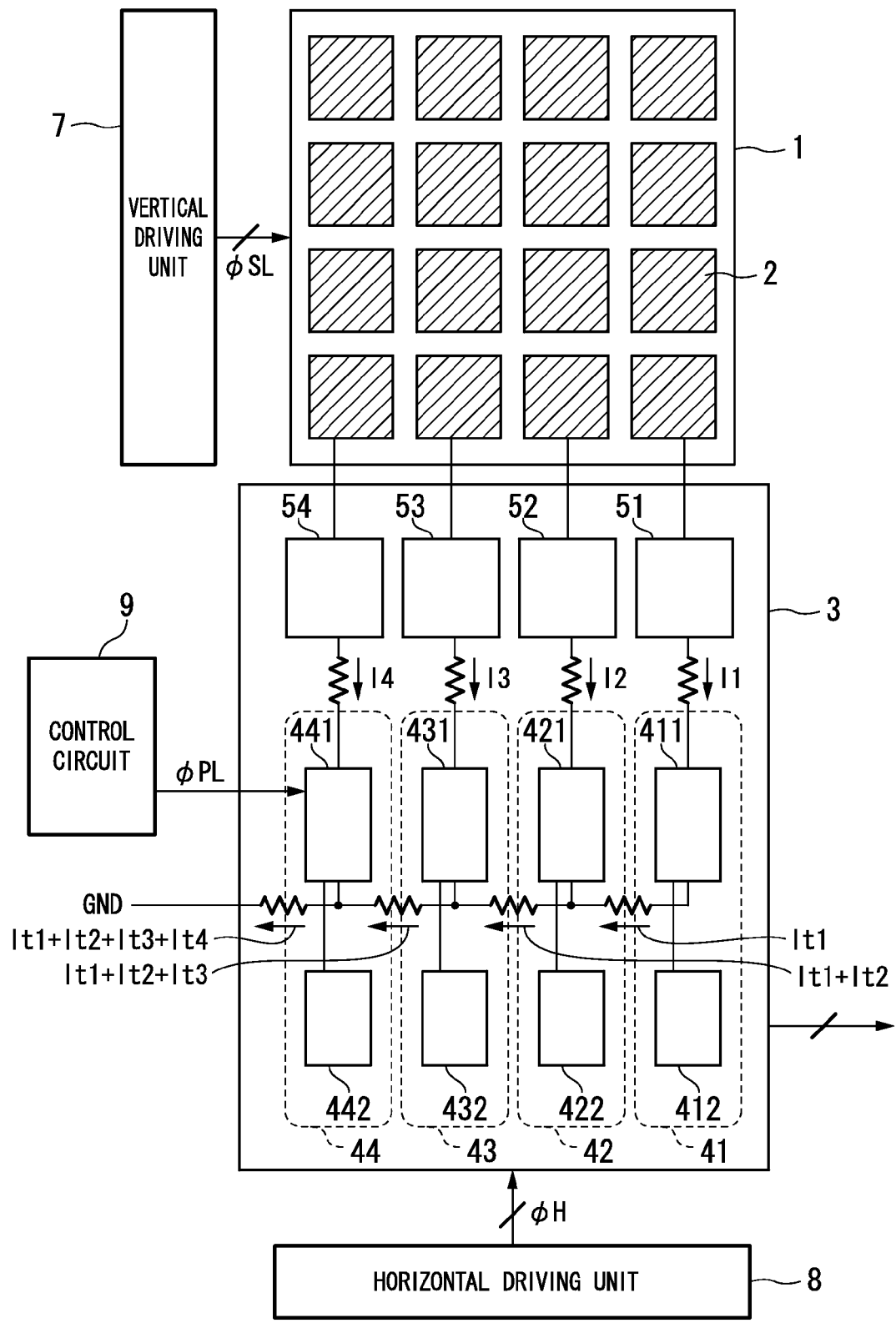
FIG. 8 is a block diagram illustrating a schematic configuration of a solid state image pickup device in which an A/D converter of a TDC type is arranged for each column of pixels.
Figure 9A:
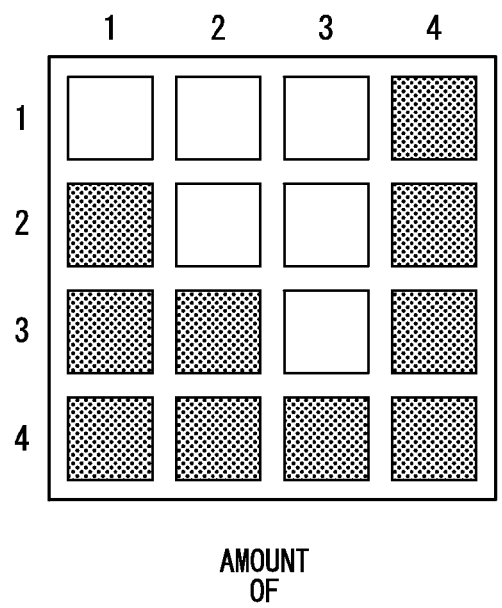
FIG. 9A and FIG. 9B are diagrams schematically illustrating examples in which digital values output from the A/D converter of a TDC type vary corresponding to pixels.
Figure 9B:
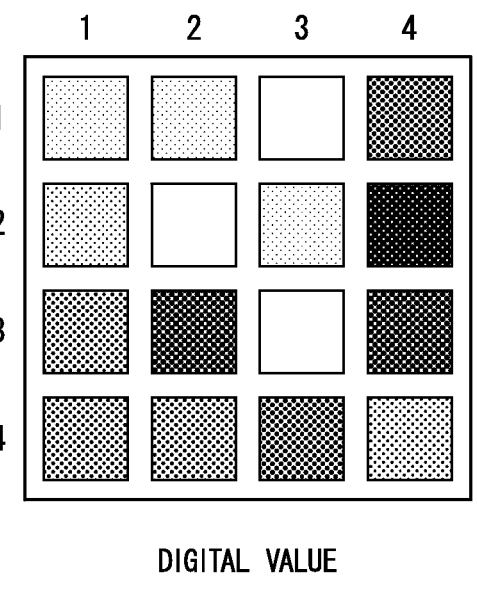
Figure 10:
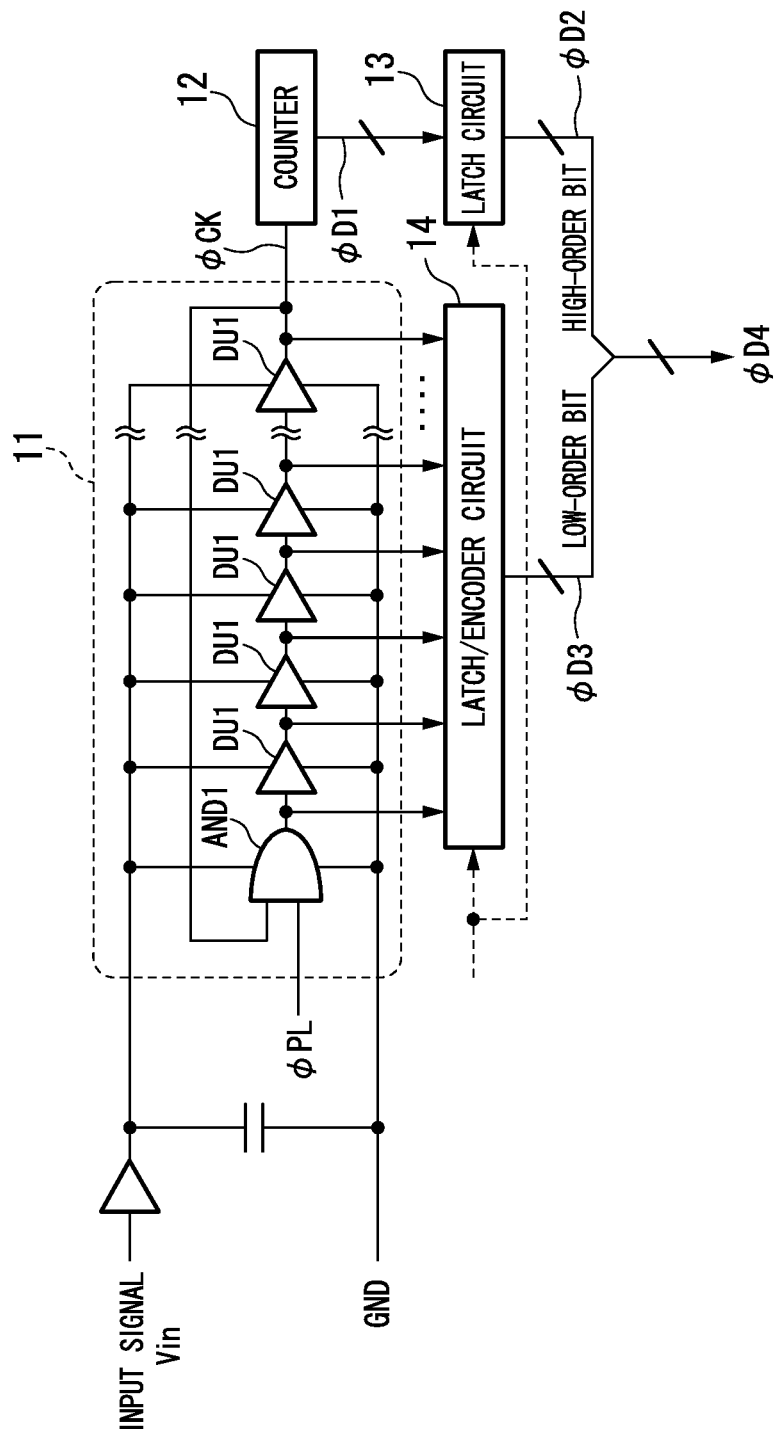
FIG. 10 is a block diagram illustrating a schematic configuration of the A/D converter that is configured to suppress a change in voltage levels in accordance with the related art.

A first preferred embodiment of the present invention will be described below with reference to the accompanying drawings. FIG. 1 is a block diagram illustrating a schematic configuration of a solid state image pickup device in accordance with the first preferred embodiment of the present invention. A solid state image pickup device 100 illustrated in FIG. 1 includes a pixel unit 1 including a plurality of pixels 2 arranged in the form of a matrix, a signal processing unit 3, a vertical driving unit 7, a horizontal driving unit 8, and a control circuit 9. The signal processing unit 3 includes a plurality of analog signal processing circuits 51 to 54, a plurality of A/D converting circuits 41 to 44, and a plurality of switching circuits 61 to 64. The A/D converting circuits 41 to 44 include delay circuits 411 to 441 and pulse passing stage number detecting circuits 412 to 442, respectively. In the solid state image pickup device 100 illustrated in FIG. 1, the same components as in the solid state image pickup device illustrated in FIG. 8 are denoted by the same reference numerals.

The following description will be made in connection with an example in which a CDS circuit is used as the analog signal processing circuit of the solid state image pickup device 100. The analog signal processing circuits 51 to 54 are represented as CDS circuits 51 to 54, respectively. In addition, in the following description, any one of the CDS circuits 51 to 54 is represented as "CDS circuit 5." Any one of the A/D converting circuits 41 to 44 is represented as "A/D converting circuit 4." Any one of the switching circuits 61 to 64 is represented as "switching circuit 6."

The pixel 2 is a photoelectric conversion element. When the pixel 2 is selected by the vertical driving unit 7, the pixel 2 outputs a pixel signal of a level according to the amount of incident light.

The vertical driving unit 7 functions as a circuit for selecting a row of pixels 2 whose pixel signal is read out from the pixel unit 1. The vertical driving unit 7 outputs a pixel selection signal φSL corresponding to a row of pixels 2 whose pixel signal is read out from the pixel unit 1 to the pixel unit 1.

The signal processing unit 3 processes pixel signals output from pixels 2 of each column of the pixel unit 1, and then outputs an A/D converted digital signal as a digital pixel signal of each column of the pixel unit 1. The details of the signal processing unit 3 will be described later.

The horizontal driving unit 8 functions as a circuit for outputting the digital image signal output from the signal processing unit 3 for each column of the pixel unit 1. The horizontal driving unit 8 outputs a read control signal φH corresponding to a column of the pixel unit 1 through which the digital image signal is output to the signal processing unit 3.

The control circuit 9 functions as a circuit for controlling timing for processing an image signal in the signal processing unit 3. The control circuit 9 outputs a clamp signal φCLP and a sampling signal φSH for controlling the CDS circuit 5 in the signal processing unit 3 and a switching signal φPC for controlling the switching circuit 6 in the signal processing unit 3 to the signal processing unit 3, according to timing for processing the image signal through the signal processing unit 3. Further, the control circuit 9 outputs an input pulse φPL for A/D converting the pixel signals output from the pixels 2 of each column of the pixel unit 1 to the signal processing unit 3 to the signal processing unit 3. The details of timing for controlling the signal processing 3 by the control circuit 9 will be described later.

Each of the CDS circuits 51 to 54 in the signal processing unit 3 is arranged for each column of the pixel unit 1. The CDS circuits 51 to 54 process the pixel signals read out from the pixels 2 according to the clamp signal φCL and the sampling signal φSH input from the control circuit 9, and then output the processed pixel signals to the corresponding A/D converting circuits 41 to 44, respectively. A number following the CDS circuit 5 as in the CDS circuits 51 to 54 indicates the number of a column of the pixel unit 1.

Each of the A/D converting circuits 41 to 44 in the signal processing unit 3 is arranged for each column of the pixel unit 1 and functions as an A/D converter of the TDC type for A/D converting the processed pixel signals, respectively, input from the CDS circuits 51 to 54, respectively, according to the input pulse φPL input from the control circuit 9. The A/D converting circuits 41 to 44 sequentially output the A/D converted digital values as the digital image signals in response to the read control signal φH input from the horizontal driving unit 8. A number following the A/D converting circuit 4 as in the A/D converting circuits 41 to 44 indicates the number of a column of the pixel unit 1.

Figure 7:
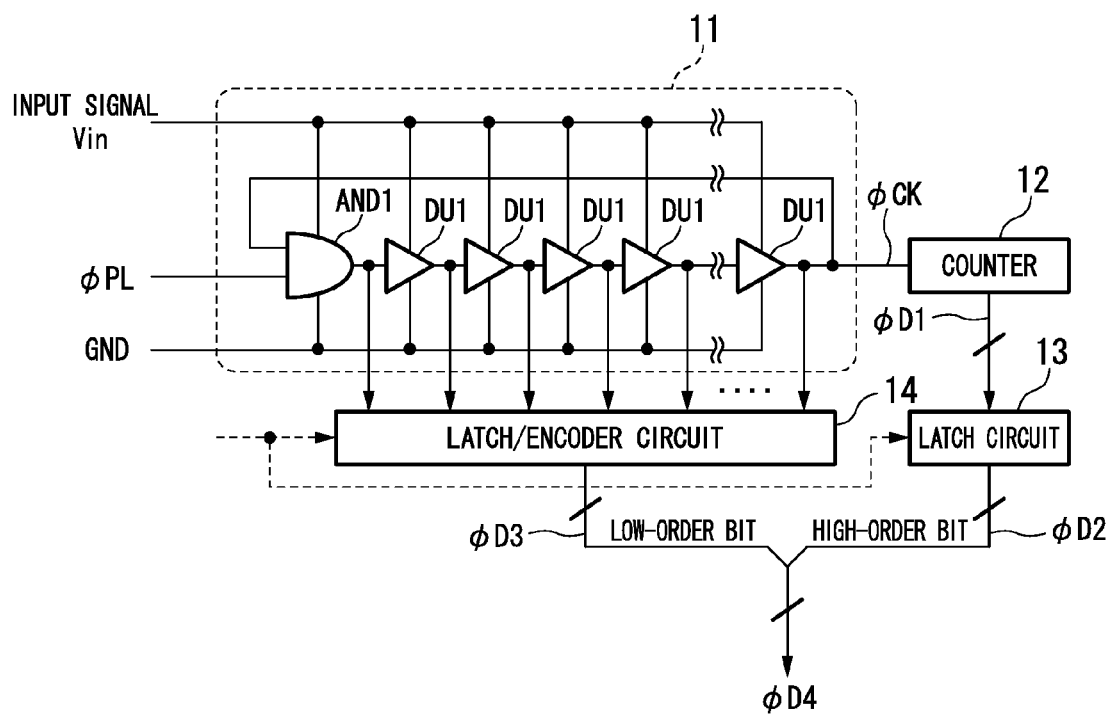
FIG. 7 is a block diagram illustrating a schematic configuration of an A/D converter of a time to digital converter (TDC) type.

Each of the delay circuits 411 to 441 arranged in the A/D converting circuits 41 to 44 has the same configuration as the delay circuit 11 arranged in the A/D converting circuit illustrated in FIG. 7. Each of the pulse passing stage number detecting circuits 412 to 442 includes a circuit having a configuration in which the counter 12, the latch circuit 13, and the latch/encoder circuit 14 of the A/D converting circuit illustrated in FIG. 7 are combined.

Each of the switching circuits 61 to 64 in the signal processing unit 3 is arranged for each column of the pixel unit 1 and functions as a circuit for switching a connection of a capacitor in each of the CDS circuits 51 to 54 in response to the switching signal φPC input from the control circuit 9. The CDS circuits 51 to 54 are switched to a configuration for suppressing the change in the voltage level the GND terminal and the input terminals of the delay circuits 411 to 441 respectively arranged in the A/D converting circuits 41 to 44, in response to switching of a connection of a capacitor by the switching circuits 61 to 64. The switching circuit 6 switches the capacitor in the CDS circuit 5, during a time period (hereinafter referred to as "A/D conversion time period") during which the A/D converting circuit 4 performs A/D conversion, according to control of the control circuit 9. A number following the switching circuit 6 as in the switching circuits 61 to 64 indicates the number of a column of the pixel unit 1.

Here, a description will be made in connection with an operation of the solid state image pickup device 100 in accordance with the first preferred embodiment. In the following description, a fourth column of the pixel unit 1 illustrated in FIG. 1 is described as a certain column of the pixel unit 1 arranged in the solid state image capturing unit 100 as an example. Operations of other columns of the pixel unit 1 are the same as the operation of the fourth column of the pixel unit 1, which will be described below, except that the voltage levels of the pixel signals output from the pixels 2 are different, and thus the redundant description will not be repeated.

First, when the vertical driving unit 7 selects pixels 2 of a first row of the pixel unit 1 by causing the pixel selection signal φSH to have a "high" level, pixel signals read out from the pixels 2 of the selected first row are output to the signal processing unit 3. From each of the selected pixels 2, two pixel signals are output: a pixel signal having a reset level output when the photoelectric conversion element in its own pixel 2 is reset; and a pixel signal having a signal level corresponding to the amount of incident light.

Then, by processing the difference between the reset level and the signal level input from the corresponding pixel 2, the CDS circuit 51 in the signal processing unit 3 generates a differential signal in which noise occurring when the pixel 2 is reset is suppressed, and outputs the generated differential signal to the corresponding A/D converting circuit 41 as the input signal Vin. As a result, the pixel signal (differential signal) in which noise is suppressed is input to the delay elements in the delay circuit 411 arranged in the A/D converting circuit 41 as a power voltage.

Subsequently, the control circuit 9 causes the input pulse φPL output to each A/D converting circuit 4 to transition to a "high" level. As a result, the delay elements in the delay circuit 411 arranged in the A/D converting circuit 41 delay the input pulse φPL by the delay time corresponding to a voltage difference between the differential signal (input signal Vin) input as the power voltage and the GND voltage. Then, the delay circuit 411 generates a pulse signal φCK having a frequency corresponding to the delay time of each delay element.

Then, the counter 12 in the pulse passing stage number detecting circuit 412 counts the circulation number that the input pulse φPL has circulated inside the delay circuit 411 based on the pulse signal φCK generated by the delay circuit 411. Thereafter, when a predetermined time period elapses, the latch/encoder circuit 14 in the pulse passing stage number detecting circuit 412 detects position information of the pulse signal φCK inside the delay circuit 411 based on outputs of the delay elements in the delay circuit 411. The latch circuit 13 in the pulse passing stage number detecting circuit 412 stores (latches) the count result output from the counter 12.

Thereafter, the control circuit 9 causes the input pulse φPL to transition to a "low" level. As a result, delay of the input pulse φPL by the delay circuit 411 stops, and generation of the input pulse φCK is finished. Then, digital signals corresponding to the differential signals (input signals Vin) input from the CDS circuit 51, that is, digital signals corresponding to the pixel signals, in which noise is suppressed, output from the pixels 2 of the fourth column of the pixel unit 1, are output as the digital image signals (digital values) output by the A/D converting circuit 41 based on the circulation number of the input pulse φPL latched by the latch circuit 13 and the position information of the pulse signal φCK detected by the latch/encoder circuit 14.

Subsequently, the horizontal driving unit 8 sequentially causes the read control signals φH to transition to a "high" level. As a result, the digital image signals output from the A/D converting circuits 4 in the signal processing unit 3 are sequentially selected, and then output to the outside as image capturing signals of the solid state image pickup device 100. The vertical driving unit 7 causes the pixel selection signal φSL to transition to a "low" level, and thus reading of the pixels of the first row of the pixel unit 1 is completed.

Thereafter, by repeating an operation of reading pixels of other rows of the pixel unit 1 in the same manner, pixels of second and subsequent rows are sequentially read out. As a result, all pixels of the pixel unit 1 arranged in the solid state image pickup device 100 are read out.

First Configuration

Figure 2:
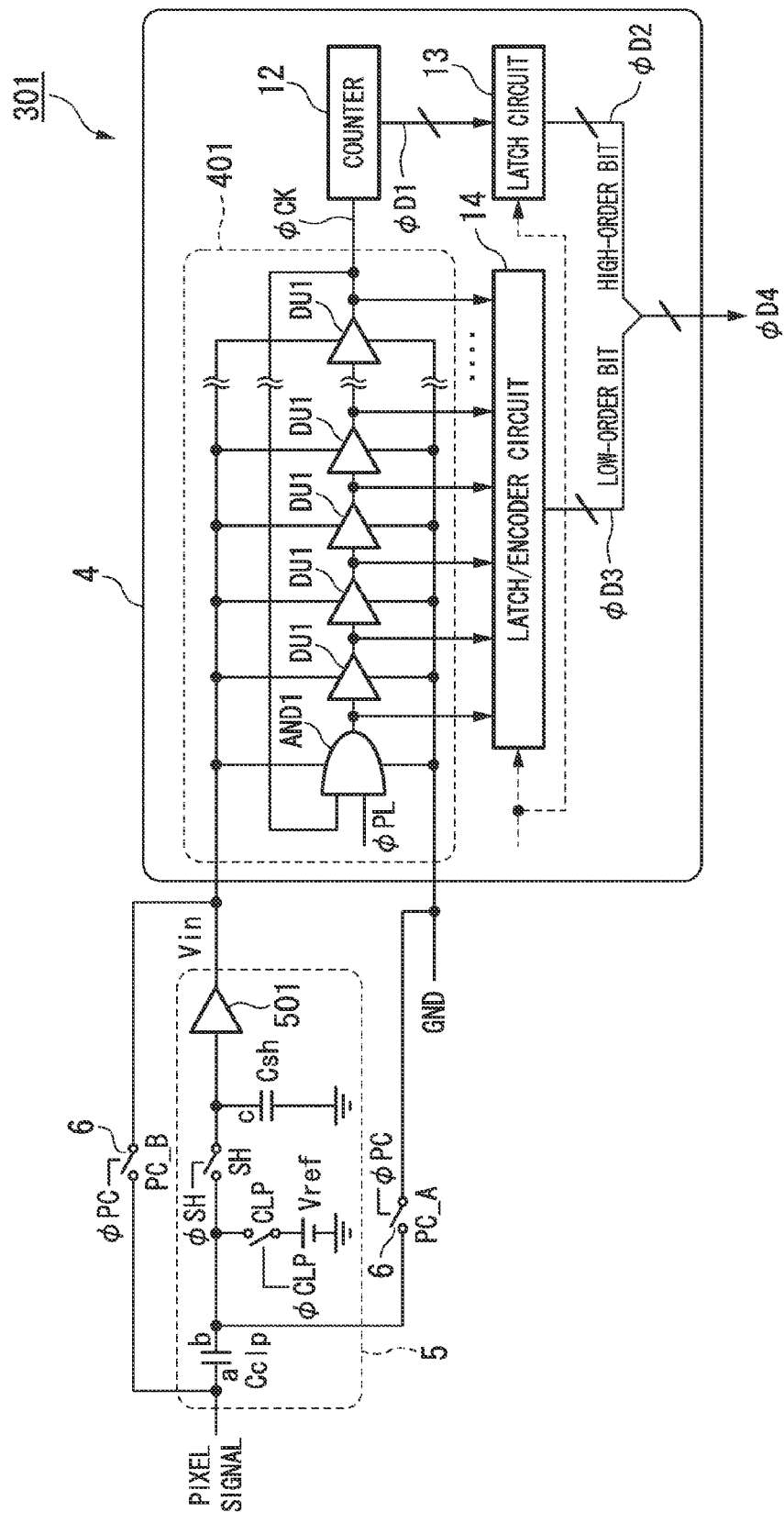
FIG. 2 is a block diagram illustrating a first schematic configuration of a signal processing unit arranged in the solid state image pickup device in accordance with the first preferred embodiment of the present invention.

Next, a description will be made in connection with a first configuration of the signal processing unit 3 arranged in the solid state image capturing unit 100 in accordance with the first preferred embodiment of the present invention. FIG. 2 is a block diagram illustrating a first schematic configuration of the signal processing unit 3 arranged in the solid state image pickup device 100 in accordance with the first preferred embodiment of the present invention. FIG. 2 illustrates only components inside the signal processing unit 3 corresponding to one column of the pixel unit 1. A signal processing unit 301 illustrated in FIG. 2 includes a CDS circuit 5, an A/D converting circuit 4, and a switching circuit 6.

The CDS circuit 5 processes the difference between a voltage level of a signal component included in the pixel signal read from the pixel 2 (hereinafter referred to as "signal level") and a voltage level of a reset component (hereinafter referred to as "reset level"). As a result, a pixel signal in which the reset level is removed as noise from the signal level of each pixel 2 is generated. Then, the CDS circuit 5 stores the voltage level of the pixel signal which has been subjected to the differential process (hereinafter referred to as "differential signal"), and outputs the stored differential signal to the A/D converting circuit 4 as the input signal Vin. The CDS circuit 5 includes a clamp capacitor Cclp, a clamp switch CLP, a sampling switch SH, a sampling capacitor Csh, and a buffer 501.

The clamp switch CLP functions as a switch for connecting one end of the clamp capacitor Cclp (terminal b) with a reference voltage Vref in response to the clamp signal φCLP input from the control circuit 9. The sampling switch SH functions as a switch for connecting one end of the clamp capacitor Cclp (terminal b) with one end of the sampling capacitor Csh (terminal c) and an input terminal of the buffer 501 in response to the sampling signal φSH input from the control circuit 9.

The clamp capacitor Cclp stores the reset level included in the pixel signal read out from the pixel 2. The clamp capacitor Cclp functions as a bypass capacitor when the A/D converting circuit 4 is performing an A/D conversion operation.

The sampling capacitor Csh stores a voltage level of the reference voltage Vref (hereinafter referred to as "reference level Vref") when the pixel signal of the reset level is being output from the pixel 2. The sampling capacitor Csh stores the differential signal in which the reset level is removed from the signal level when the pixel signal of the signal level is being output from the pixel 2. The sampling capacitor Csh outputs the stored differential signal to the A/D converting circuit 4 via the buffer 501 as the input signal Vin which is to be subjected to A/D conversion.

The A/D converting circuit 4 A/D performs A/D conversion on the differential signal input from the CDS circuit 5, and outputs the A/D converted digital value as the digital image signal. The A/D converting circuit 4 includes a delay circuit 401, a counter 12, a latch circuit 13, and a latch/encoder circuit 14. In the following description, a combination of the counter 12, the latch circuit 13, and the latch/encoder circuit 14 is referred to as "pulse passing stage number detecting circuit."

The delay circuit 401 includes a plurality of delay elements (one delay element AND1 and a plurality of delay elements DU1 in FIG. 2), which are connected in a ring form. The differential signal input from the CDS circuit is input to each of the delay elements in the delay circuit 401 as the input signal Vin which is to be subjected to A/D conversion. Each of the delay elements in the delay circuit 401 delays the input pulse φPL by a delay time corresponding to a voltage difference between the signal level of the input signal Vin and the GND level using the input signal Vin as a power voltage. Then, the delay circuit 401 generates the pulse signal φCK having a frequency corresponding to the delay time of each delay element.

The counter 12 counts the pulse signal φCK generated from the delay circuit 401, that is, a circulation number in which the input pulse φPL has circulated the delay circuit 11, and outputs the count result as a digital signal φD1. The latch circuit 13 stores (latches) the digital signal φD1 output from the counter 12, and outputs the latched digital signal as a digital signal φD2. The latch/encoder circuit 14 receives outputs of the delay elements in the delay circuit 401, detects a passing stage number of the delay elements in the delay circuit 401 through which the input pulse φPL has passed, that is, position information of the input pulse φCK in the delay circuit 401, and outputs the detection result as a digital signal φD3.

The A/D converting circuit 4 outputs a digital signal φD4, corresponding to the signal level of the input signal Vin, that is, the differential signal input from the CDS circuit 5, which includes the digital signal φD2 output from the latch circuit 13 as data of a high-order bit and the digital signal φD3 output from the latch/encoder circuit 14 as data of a low-order bit. The digital signal φD4 is a digital image signal (digital value) converted by the A/D converting circuit.

The switching circuit 6 switches a connection of the clamp capacitor Cclp in the CDS circuit 5 in response to the switching signal φPC input from the control circuit 9. The switching circuit 6 includes a selector switch PC_A and a selector switch PC_B.

The selector switch PC_A functions as a switch for connecting one end of the clamp capacitor Cclp (terminal b) in the CDS circuit 5 to the GND terminal of the delay circuit 401 in response to the switching signal φPC input from the control circuit 9. The selector switch PC_B functions as a switch for connecting the other end of the clamp capacitor Cclp (terminal a) in the CDS circuit 5 to the input terminal of the input signal Vin of the delay circuit 401 in response to the switching signal φPC input from the control circuit 9.

By switching a connection of the clamp capacitor Cclp in the CDS circuit 5 through the selector switch PC_A and the selector switch PC_B, the switching circuit 6 causes the clamp capacitor Cclp to function as a bypass capacitor between the input terminal of the input signal Vin and the GND terminal of the A/D converting circuit 4. As a result, the A/D converting circuit 4 can suppress the change in the voltage levels of the input signal Vin and the GND level during the A/D conversion time period during which the A/D conversion operation is performed, and can reduce the change (error) in the digital image signal (digital value) output from the A/D converting circuit 4.

Figure 3:
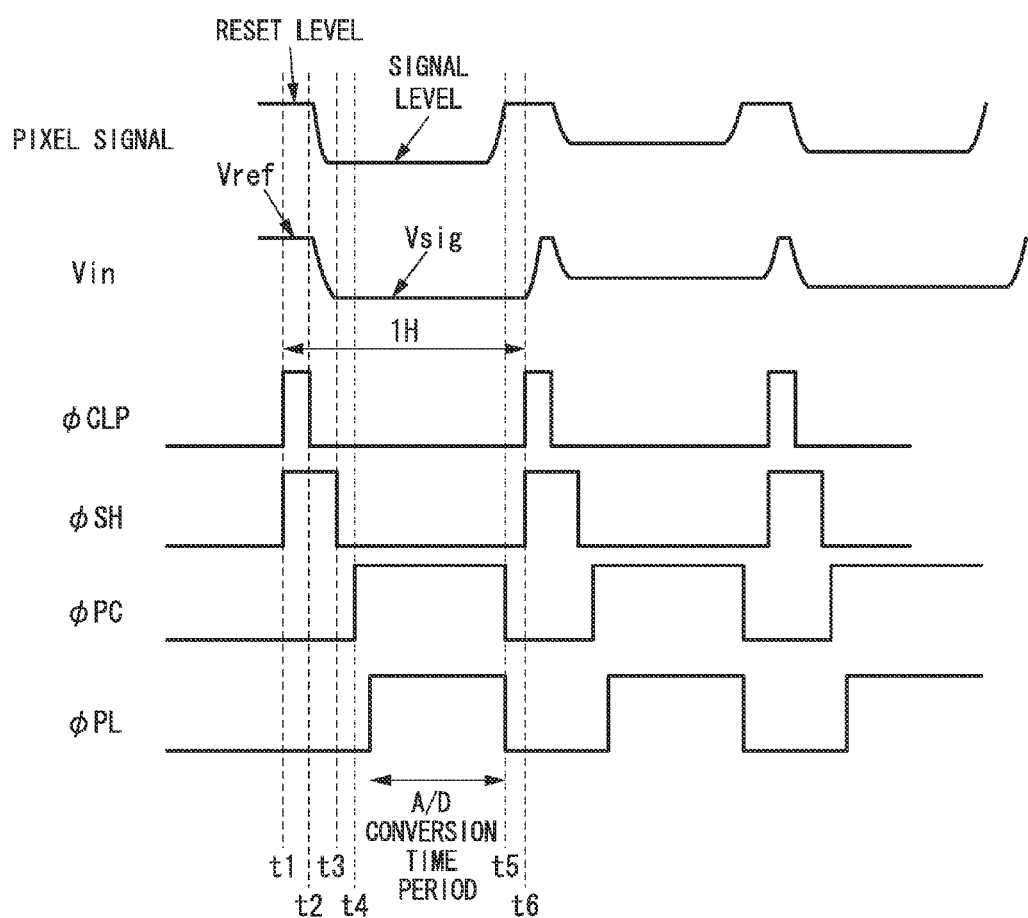
FIG. 3 is a timing chart illustrating operation timing of a first configuration of a signal processing unit arranged in the solid state image pickup device in accordance with the first preferred embodiment of the present invention.

Next, a description will be made in connection with an operation of suppressing the change in the voltage level between the input terminal of the input signal Vin and the GND terminal of the A/D converting circuit 4 in the signal processing unit 3 arranged in the solid state image pickup device 100 in accordance with the first preferred embodiment. FIG. 3 is a timing chart illustrating operation timing of the first configuration of the signal processing unit 301 arranged in the solid state image pickup device 100 in accordance with the first preferred embodiment of the present invention.

An operation of the signal processing unit 301 is controlled by the control circuit 9. FIG. 3 illustrates the pixel signal input from the pixel 2 in the pixel unit 1, the input signal Vin output to the A/D converting circuit 4 in the signal processing unit 301, the control signals, which are input from the control circuit 9, used for controlling the operations of the CDS circuit 5 and the switching circuit 6 (the clamp signal φCLP, the sampling signal φSH, and the switching signal φPC), and the input pulse φPL, which is input from the control circuit 9, used for performing A/D conversion by the A/D converting circuit 4.

The clamp signal φCLP, the sampling signal φSH, and the switching signal φPC input from the control circuit 9 are driving signals for driving the clamp switch CLP, the sampling switch SH, and the selector switches PC_A and PC_B, respectively. The following description is made under the assumption that each switch is turned on (short-circuited) when the driving signal has a "high" level, and each switch is turned off (opened) when the driving signal has a "low" level.

First, at timing t1 at which the pixel signal of the reset level is input from the pixel 2 in the pixel unit 1, the control circuit 9 turns the clamp switch CLP on by causing the clamp φCLP to have a "high" level, and turns the sampling switch SH on by causing the sampling signal φSH to have a "high" level. As a result, the terminal a of the clamp capacitor Cclp is at the reset level, and the terminal b of the clamp capacitor Cclp and the terminal c of the sampling capacitor Csh are at the reference level Vref. Then, the clamp capacitor Cclp stores a voltage level corresponding to the difference between the reset level and the reference level Vref (hereinafter referred to as "noise level"), and the sampling capacitor Csh stores the reference level Vref. The reference level Vref stored in the sampling capacitor Csh is input to the buffer 501, and the input signal Vin of the voltage level corresponding to the reference level Vref is output from the buffer 501.

Subsequently, at timing t2, the control circuit 9 turns the clamp switch CLP off by causing the clamp signal φCLP to have a "low" level. Then, as the pixel signal output from the pixel 2 in the pixel unit 1 transitions from the reset level to the signal level, the terminal a of the sampling capacitor Csh also transitions to the signal level, and the terminal b of the clamp capacitor Cclp transitions to a voltage level corresponding to the difference between the noise level and the signal level (hereinafter referred to as "signal level Vsig"). The signal level Vsig refers to the differential signal in which noise is suppressed when the pixel 2 is reset, that is, the pixel signal, in which noise is suppressed, to be subjected to A/D conversion.

Subsequently, at timing t3, the control circuit 9 turns the sampling switch SH off by causing the sampling signal φSH to have a "low" level. As a result, the signal level Vsig is stored in the sampling capacitor Csh. The signal level Vsig stored in the sampling capacitor Csh is input to the buffer 501, and the input signal Vin of the voltage level corresponding to the signal level Vsig is output from the buffer 501.

Subsequently, at timing t4, the control circuit 9 turns the selector switches PC_A and PC_B in the switching circuit 6 on by causing the switching signal φPC to have a "high" level. As a result, the terminal b of the clamp capacitor Cclp is connected to the GND terminal of the delay circuit 401 arranged in the A/D converting circuit 4, and the terminal a of the clamp capacitor Cclp is connected to the input terminal of the input signal Vin of the delay circuit 401, that is, the power supply terminals of the delay elements in the delay circuit 401. As a result, the clamp capacitor Cclp is used as the bypass capacitor between the input terminal of the input signal Vin and the GND terminal of the A/D converting circuit 4.

Thereafter, the control circuit 9 causes the input pulse φPL to have a "high" level. As a result, the A/D converting circuit 4 starts A/D conversion of the signal level Vsig which is the voltage level of the pixel signal in which noise is suppressed. Then, at timing 5 at which a predetermined A/D conversion time period has elapsed, the control circuit 9 causes the input pulse φPL to have a "low" level, and thus the A/D converting circuit 4 outputs the A/D converted digital image signal (digital value).

In addition, at timing t5, the control circuit 9 turns the selector switches PC_A and PC_B in the switching circuit 6 off by causing the switching signal φPC to have a "low" level. As a result, the terminal b of the clamp capacitor Cclp is disconnected from the GND terminal of the delay circuit 401 arranged in the A/D converting circuit 4, and the terminal a of the clamp capacitor Cclp is disconnected from the input terminal of the input signal Vin of the delay circuit 401, that is, the power supply terminals of the delay elements in the delay circuit 401. As a result, the clamp capacitor Cclp is used as the clamp capacitor arranged in the CDS circuit 5.

At timing t6 or later, similarly to timing t1 to timing t5, the control circuit 9 controls the clamp signal φCLP, the sampling signal φSH, and the switching signal φPC, and the control circuit 9 controls the input pulse φPL, so that the digital image signal (digital value) in another row in the pixel unit 1 is output.

As described above, as the control circuit 9 controls the selector switches PC_A and PC_B, during the A/D conversion time period, one end (terminal b) of the clamp capacitor Cclp is connected to the GND terminal of the delay circuit 401, and the other end (terminal a) of the clamp capacitor Cclp is connected to the power supply terminal of the delay circuit 401. That is, during an operation in which the delay circuit 401 delays the input pulse φPL, both terminals of the clamp capacitor Cclp are connected to the input terminal and the GND terminal of the delay circuit 401, respectively, and thus the clamp capacitor Cclp acts as the bypass capacitor. In this state, the clamp capacitor Cclp supplies a voltage level corresponding to a change in current flowing between the input terminal and the GND terminal of the delay circuit 401, which changes according to a status in which the input pulse φPL is passing the plurality of delay elements in each A/D converting circuit 4. As a result, it is possible to reduce the change in the current, which flows through the GND terminal wired in common to the A/D converting circuit 4, according to the input line of each A/D converting circuit 4, the voltage levels of the pixel signals output from the pixels 2 in one row of the pixel unit 1, and an operation status of the delay circuit 401 through which the input pulse φPL is passing.

As described above, in the signal processing unit 301 of the first configuration, during the A/D conversion time period, the clamp capacitor Cclp in the CDS circuit 5 can be used as the bypass capacitor of the delay circuit 401 in the A/D converting circuit 4. Thus, in the signal processing unit 301 of the first configuration, a configuration capable of suppressing the change in the voltage levels of the input and the GND of the delay circuit 401 in the A/D converting circuit 4 can be implemented without installing a new bypass capacitor, similarly to the A/D converting circuit including the bypass capacitor disclosed in Patent Document 2. Through this configuration, in the solid state image pickup device 100 in accordance with the first preferred embodiment, the current flowing between the power supply terminal and the GND terminal of the delay circuit 4 can remain constant during an operation of the A/D converting circuit 4. Thus, even when the A/D converting circuit 4 is installed for each column of the pixel unit 1, the change in the input terminal and the GND terminal of the delay circuit 401 in the A/D converting circuit 4 can be reduced, and noise occurring during the A/D conversion process can be reduced.

Second Configuration

Figure 4:
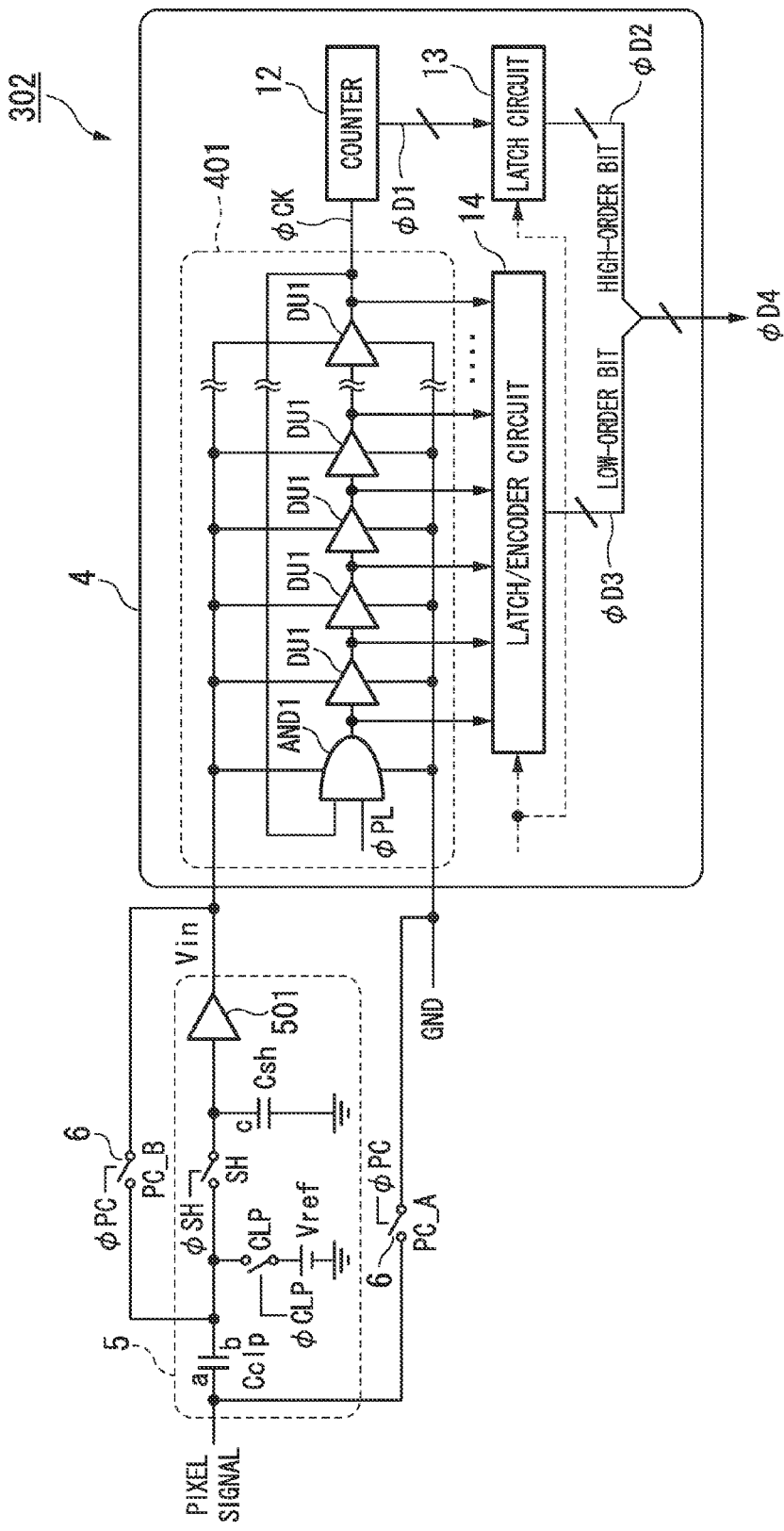
FIG. 4 is a block diagram illustrating a second schematic configuration of the signal processing unit arranged in the solid state image pickup device in accordance with the first preferred embodiment of the present invention.

Next, a description will be made in connection with a second configuration of the signal processing unit 3 arranged in the solid state image capturing unit 100 in accordance with the first preferred embodiment of the present invention. FIG. 4 is a block diagram illustrating a second schematic configuration of the signal processing unit 3 arranged in the solid state image pickup device 100 in accordance with the first preferred embodiment of the present invention. FIG. 4 illustrates only components inside the signal processing unit 3 corresponding to one column of the pixel unit 1. A signal processing unit 302 illustrated in FIG. 4 includes a CDS circuit 5, an A/D converting circuit 4, and a switching circuit 6. In the signal processing unit 302 illustrated in FIG. 4, the same components as in the signal processing unit 301 illustrated in FIG. 2 are denoted by the same reference numerals.

The signal processing unit 302 is different from the signal processing unit 301 illustrated in FIG. 2 in connections between the clamp capacitor Cclp and the selector switches PC_A and PC_B in the switching circuit 6. More specifically, the difference lies in that the selector switch PC_A functions to connect the other end (terminal a) of the clamp capacitor Cclp in the CDS circuit 5 to the GND terminal of the delay circuit 401, and the selector switch PC_B functions to connect one end (terminal b) of the clamp capacitor Cclp in the CDS circuit 5 to the input terminal of the input signal Vin of the delay circuit 401.

Operation timing of the signal processing unit 302 is the same as the operation timing of the signal processing unit 301 illustrated in FIG. 3, and thus the redundant description will not be repeated.

In the signal processing unit 302 of the configuration illustrated in FIG. 4, during an operation in which the delay circuit 401 delays the input pulse φPL, both terminals of the clamp capacitor Cclp are connected to the input terminal and the GND terminal of the delay circuit 401, respectively, and the clamp capacitor Cclp can act as the bypass capacitor. Thus, the same effect as in the signal processing unit 301 illustrated in FIG. 2 can be obtained.

Preferably, the connection in either of the signal processing unit 301 illustrated in FIG. 2 and the signal processing unit 302 illustrated in FIG. 4 is selected as the connection of the selector switches PC_A and PC_B in the switching circuit 6 such that a high potential side of the power supply terminals of each delay element in the delay circuit 401 is connected to a high potential side of the terminals of the clamp capacitor Cclp.

Second Preferred Embodiment

Next, a description will be made in connection with a solid state image pickup device in accordance with a second preferred embodiment of the present invention. The solid state image pickup device in accordance with the second preferred embodiment is almost the same in configuration as the solid state image pickup device 100 in accordance with the first preferred embodiment. Thus, the solid state image pickup device in accordance with the second preferred embodiment will be described with reference to the solid state image pickup device 100 in accordance with the first preferred embodiment. Further, respective components will be described in connection with different operations, and a redundant description will not be repeated.

The control circuit 9 functions as a circuit for controlling timing for processing an image signal in the signal processing unit 3. The control circuit 9 arranged in the solid state image pickup device in accordance with the second preferred embodiment controls the selector switch PC_A and the selector switch PC_B in the switching circuit 6 arranged in the signal processing unit 3, respectively. More specifically, the control circuit 9 outputs a switching signal φPC1 for controlling the selector switch PC_A and a switching signal φPC2 for controlling the selector switch PC_B to the signal processing unit 3. The details of timing for controlling the signal processing unit 3 in the control circuit 9 arranged in the solid state image pickup device in accordance with the second preferred embodiment will be described later.

The switching circuit 6 in the signal processing unit 3 is arranged for each column of the pixel unit 1. The switching circuit 6 switches a connection of a capacitor in the CDS circuit 5 in response to the switching signal φPC1 and the switching signal φPC2 input from the control circuit 9, so that the CDS circuit 5 is switched to a configuration for suppressing the change in the voltage levels of the input terminal and the GND terminal of the delay circuit 401 arranged in each of the A/D converting circuits 4.

The operation of the solid state image pickup device in accordance with the second preferred embodiment is similar to the operation of the solid state image pickup device 100 in accordance with the first preferred embodiment illustrated in FIG. 1 except for operations of the selector switches PC_A and PC_B in the switching circuit 6 arranged in the signal processing unit 3 and an operation of the clamp switch CLP in the CDS circuit 5 arranged in the signal processing unit 3, and thus, a redundant description thereof will not be repeated here.

Next, a description will be made in connection with the signal processing unit 3 arranged in the solid state image capturing unit in accordance with the second preferred embodiment.

Figure 5:
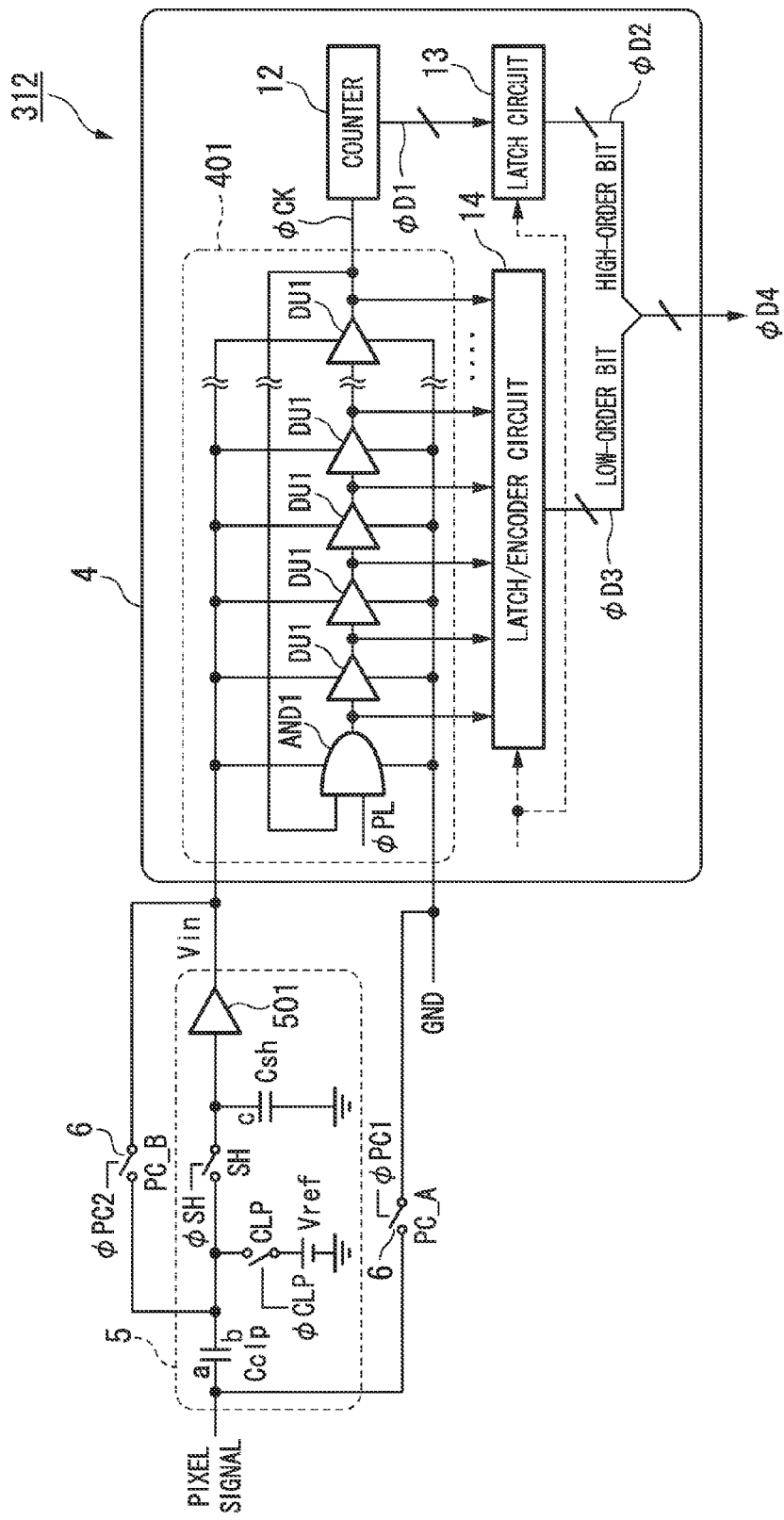
FIG. 5 is a block diagram illustrating a schematic configuration of the signal processing unit arranged in the solid state image pickup device in accordance with a second preferred embodiment of the present invention.

FIG. 5 is a block diagram illustrating a schematic configuration of the signal processing unit 3 arranged in the solid state image pickup device in accordance with the second preferred embodiment of the present invention. FIG. 5 illustrates only components inside the signal processing unit 3 corresponding to one column of the pixel unit 1. A signal processing unit 312 illustrated in FIG. 5 includes a CDS circuit 5, an A/D converting circuit 4, and a switching circuit 6. In the signal processing unit 312 illustrated in FIG. 5, the same components as in the signal processing unit 301 illustrated in FIG. 2 and the signal processing unit 302 illustrated in FIG. 4 are denoted by the same reference numerals.

The signal processing unit 312 is different from the signal processing unit 302 illustrated in FIG. 4 in that the signal processing unit 312 uses the switching signal φPC1 as the switching signal for controlling the selector switch PC_A in the switching circuit 6, and uses the switching signal φPC2 as the switching signal for controlling the selector switch PC_B. Thus, the components of the signal processing unit 312 will be described in connection with different operations, and a redundant description thereof will not be repeated here.

The switching circuit 6 switches a connection of the clamp capacitor Cclp in the CDS circuit 5 in response to the switching signals φPC1 and φPC2 input from the control circuit 9. The switching circuit 6 includes the selector switch PC_A and the selector switch PC_B.

The selector switch PC_A functions as a switch for connecting the other end of the clamp capacitor Cclp (terminal a) in the CDS circuit 5 to the GND terminal of the delay circuit 401 in response to the switching signal φPC1 input from the control circuit 9. The selector switch PC_B functions as a switch for connecting one end of the clamp capacitor Cclp (terminal b) in the CDS circuit 5 to the input terminal of the input signal Vin of the delay circuit 401 in response to the switching signal φPC2 input from the control circuit 9.

By switching the connection of the clamp capacitor Cclp in the CDS circuit 5 through the selector switch PC_A and the selector switch PC_B, the switching circuit 6 causes the clamp capacitor Cclp to function as a bypass capacitor between the input terminal of the input signal Vin of the A/D converting circuit 4 and the GND terminal, similarly to the signal processing unit 301 illustrated in FIG. 2 and the signal processing unit 302 illustrated in FIG. 4. As a result, the A/D converting circuit 4 can suppress the change in the voltage level of the input signal Vin and the GND level during the A/D conversion time period during which the A/D conversion operation is performed, and can reduce the change (error) in the digital image signal (digital value) output from the A/D converting circuit 4.

Figure 6:
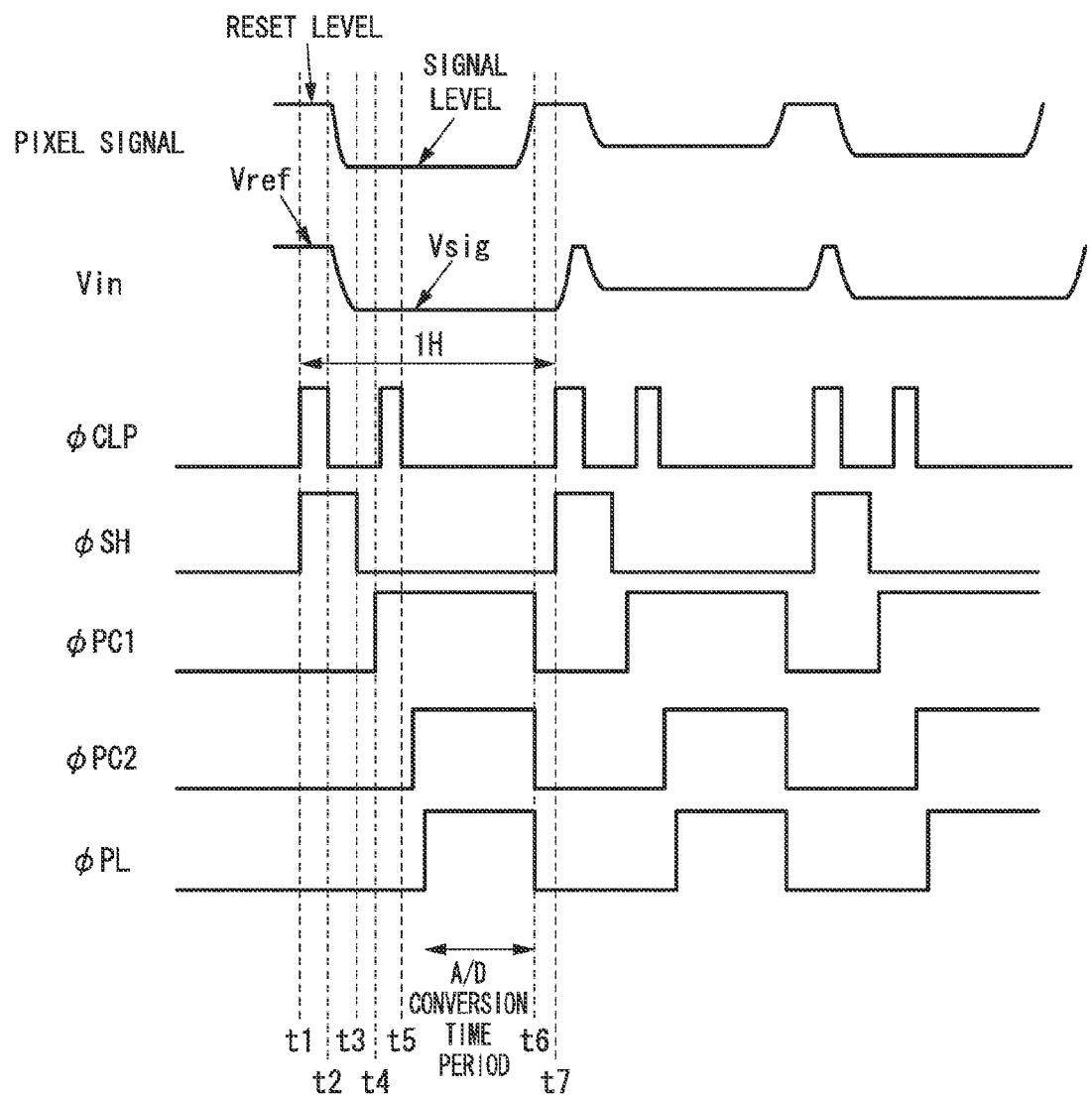
FIG. 6 is a timing chart illustrating operation timing of the signal processing unit arranged in the solid state image pickup device in accordance with the second preferred embodiment of the present invention.

Next, a description will be made in connection with an operation of suppressing the change in the voltage level between the input terminal of the input signal Vin and the GND terminal of the A/D converting circuit 4 in the signal processing unit 3 arranged in the solid state image pickup device in accordance with the second preferred embodiment. FIG. 6 is a timing chart illustrating operation timing of the signal processing unit 3 arranged in the solid state image pickup device in accordance with the second preferred embodiment of the present invention.

An operation of the signal processing unit 312 is controlled by the control circuit 9. FIG. 6 illustrates the pixel signal input from the pixel 2 in the pixel unit 1, the input signal Vin output to the A/D converting circuit 4 in the signal processing unit 312, the control signal, which is input from the control circuit 9, used for controlling an operation of the CDS circuit 5 (the clamp signal φCLP and the sampling signal φSH), the control signals (the switching signals φPC1 and φPC2), which are input from the control circuit 9, used for controlling an operation of the switching circuit 6, and the input pulse φPL, which is input from the control circuit 9, used for performing A/D conversion by the A/D converting circuit 4.

The clamp signal φCLP, the sampling signal φSH, and the switching signals φPC1 and φPC2 input from the control circuit 9 are driving signals for driving the clamp switch CLP, the sampling switch SH, and the selector switches PC_A and PC_B, respectively. The following description is made under the assumption that each switch is turned on (short-circuited) when the driving signal has a "high" level, and each switch is turned off (opened) when the driving signal has a "low" level.

First, at timing t1 at which the pixel signal of the reset level is input from the pixel 2 in the pixel unit 1, the control circuit 9 turns the clamp switch CLP on by causing the clamp φCLP to have a "high" level, and turns the sampling switch SH on by causing the sampling signal φSH to have a "high" level. As a result, the terminal a of the clamp capacitor Cclp is at the reset level, and the terminal b of the clamp capacitor Cclp and the terminal c of the sampling capacitor Csh are at the reference level Vref. Then, the clamp capacitor Cclp stores the noise level corresponding to the difference between the reset level and the reference level Vref, and the sampling capacitor Csh stores the reference level Vref. The reference level Vref stored in the sampling capacitor Csh is input to the buffer 501, and the input signal Vin of the voltage level corresponding to the reference level Vref is output from the buffer 501.

Subsequently, at timing t2, the control circuit 9 turns the clamp switch CLP off by causing the clamp signal φCLP to have a "low" level. Then, as the pixel signal output from the pixel 2 in the pixel unit 1 transitions from the reset level to the signal level, the terminal a of the sampling capacitor Csh also transitions to the signal level, and the terminal b of the clamp capacitor Cclp transitions to the signal level Vsig corresponding to the difference between the noise level and the signal level. The signal level Vsig refers to the differential signal, in which noise is suppressed when the pixel 2 is reset, that is, the pixel signal, in which noise is suppressed, to be subjected to A/D conversion.

Subsequently, at timing t3, the control circuit 9 turns the sampling switch SH off by causing the sampling signal φSH to have a "low" level. As a result, the signal level Vsig is stored in the sampling capacitor Csh. The signal level Vsig stored in the sampling capacitor Csh is input to the buffer 501, and the input signal Vin of the voltage level corresponding to the signal level Vsig is output from the buffer 501.

Subsequently, at timing t4, the control circuit 9 turns the selector switch PC_A in the switching circuit 6 on by causing the switching signal φPC1 to have a "high" level. As a result, the terminal a of the clamp capacitor Cclp is connected to the GND terminal of the delay circuit 401 arranged in the A/D converting circuit 4. Then, the control circuit 9 turns the clamp switch CLP on by causing the clamp signal φCLP to have a "high" level. As a result, the terminal b of the clamp capacitor Cclp is connected to the reference level Vref. As a result, the clamp capacitor Cclp stores the reference level Vref before the A/D converting circuit 4 starts A/D conversion. That is, the clamp capacitor Cclp is pre-charged to the voltage level of the reference level Vref.

Subsequently, at timing t5, the control circuit 9 turns the clamp switch CLP off by causing the clamp signal φCLP to have a "low" level. Thereafter, the control circuit 9 turns the selector switch PC_B in the switching circuit 6 on by causing the switching signal φPC2 to have a "high" level. As a result, the terminal b of the clamp capacitor Cclp is connected to the input terminal of the input signal Vin of the delay circuit 401, that is, the power supply terminal of the delay element in the delay circuit 401. Then, the clamp capacitor Cclp is used as the bypass capacitor between the input terminal of the input signal Vin and the GND terminal of the A/D converting circuit 4.

Thereafter, the control circuit 9 causes the input pulse φPL to have a "high" level. As a result, the A/D converting circuit 4 starts A/D conversion of the signal level Vsig which is the voltage level of the pixel signal in which noise is suppressed. Then, at timing t6 at which a predetermined A/D conversion time period has elapsed, the control circuit 9 causes the input pulse φPL to have a "low" level, and thus the A/D converting circuit 4 outputs the A/D converted digital image signal (digital value).

In addition, at timing t6, the control circuit 9 turns the selector switches PC_A and PC_B in the switching circuit 6 off by causing the switching signals φPC1 and φPC2 to have a "low" level. As a result, the terminal a of the clamp capacitor Cclp is disconnected from the GND terminal of the delay circuit 401 arranged in the A/D converting circuit 4, and the terminal b of the clamp capacitor Cclp is disconnected from the input terminal of the input signal Vin of the delay circuit 401, that is, the power supply terminals of the delay elements in the delay circuit 401. As a result, the clamp capacitor Cclp is used as the clamp capacitor arranged in the CDS circuit 5.

At timing t7 or later, similarly to timing t1 to timing t6, the control circuit 9 controls the clamp signal φCLP, the sampling signal φSH, the switching signal φPC1 and the switching signal φPC2, and the control circuit 9 controls the input pulse φPL, so that a digital image signal (digital value) in another row in the pixel unit 1 is output.

As described above, as the control circuit 9 controls the selector switches PC_A and PC_B, during the A/D conversion time period, the other end (terminal a) of the clamp capacitor Cclp is connected to the GND terminal of the delay circuit 401, and one end (terminal b) of the clamp capacitor Cclp is connected to the power supply terminal of the delay circuit 401. As a result, similarly to the clamp capacitor Cclp in accordance with the first preferred embodiment, during an operation in which the delay circuit 401 delays the input pulse φPL, both terminals of the clamp capacitor Cclp are connected to the input terminal and the GND terminal of the delay circuit 401, respectively, and the clamp capacitor Cclp acts as the bypass capacitor. Thus, the same effects as in the signal processing unit 301 and the signal processing unit 302 in accordance with the first preferred embodiment are obtained.

In addition, in the signal processing unit 312, the clamp capacitor Cclp is pre-charged to the voltage level of the reference voltage Vref before being connected between the GND terminal and the input terminal of the delay circuit 401 as the bypass capacitor. As a result, when the clamp capacitor Cclp is used as the bypass capacitor, it is possible to suppress the change in the input signal Vin of the delay circuit 401, particularly, on the pixel signal of a dark section for outputting the input signal Vin close to the voltage level of the reference voltage Vref.

As described above, in the signal processing unit 312, during the A/D conversion time period, the clamp capacitor Cclp in the CDS circuit 5 can be used as the bypass capacitor of the delay circuit 401 in the A/D converting circuit 4. Thus, a configuration capable of suppressing the change in the voltage levels of the input terminal and the GND terminal of the delay circuit 401 in the A/D converting circuit 4 can be implemented without installing a new bypass capacitor, similarly to the signal processing unit 301 and the signal processing unit 302 in accordance with the first preferred embodiment. Through this configuration, similarly to the solid state image pickup device 100 in accordance with the first preferred embodiment, in the solid state image pickup device in accordance with the second preferred embodiment, the change in the input terminal and the GND terminal of the delay circuit 401 in the A/D converting circuit 4 can be reduced, and an error in the A/D conversion process can be reduced.

As described above, according to the exemplary preferred embodiments of the present invention, the selector switch for switching the connection of the terminals of the capacitor arranged in the analog signal processing circuit of the signal processing unit is installed. Thus, during the A/D conversion time period, the capacitor in the analog signal processing circuit can be used as the bypass capacitor. Thus, a configuration capable of suppressing the change in the voltage levels of the input terminal and the GND terminal of the delay circuit in the A/D converting circuit can be implemented without installing a new bypass capacitor. That is, similarly to the A/D converting circuit including the bypass capacitor disclosed in Patent Document 2, a configuration capable of suppressing the change in the voltage levels of the input terminal and the GND terminal of the delay circuit in the A/D converting circuit can be implemented without increasing the size of the solid state image pickup device. Thus, the change (error) in the digital image signal (digital value) output from the solid state image pickup device can be reduced.

In addition, according to the exemplary preferred embodiments of the present invention, the bypass capacitor can be pre-charged to the voltage level of the reference level Vref before the A/D converting circuit starts the A/D conversion operation. As a result, it is possible to reduce the difference in the voltage level when the bypass capacitor is connected to the delay circuit in the A/D converting circuit. Particularly, by suppressing the change in the input signal to be input to the delay circuit caused by an output of a pixel of a dark section in the solid state image pickup device, the accuracy of the A/D conversion process by the A/D converting circuit can be improved.

The preferred embodiment of the present invention has been described in connection with the example in which the CDS circuit is used as the analog signal processing circuit. However, the analog signal processing circuit arranged in the solid state image pickup device in accordance with the preferred embodiment is not limited to the preferred embodiment. The concept of the preferred embodiment can be applied to any analog signal processing circuit including a capacitor having no influence on the A/D conversion process by the A/D converting circuit during the A/D conversion time period, regardless of a configuration of the analog signal processing circuit.

Further, in the preferred embodiment of the present invention, a form of a 4-by-4 matrix has been employed as an array form of the pixels in the pixel unit 1 as an example. However, an array form of pixels in the row and column directions is not limited to the preferred embodiments of the present invention, and the number of pixels in the row and column directions may be changed within a range not departing from the spirit of the present invention.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A solid state image pickup device comprising:
    a pixel unit that includes a photoelectric conversion element, the pixel unit including a plurality of pixels that are arranged in a form of a two-dimensional matrix in the pixel unit, each of the plurality of pixels outputting a reset signal, which is output when the photoelectric conversion element is reset, and a pixel signal that corresponds to an amount of light incident to the photoelectric conversion element;
    an analog signal processing unit that includes a first capacitor and a second capacitor, the reset signal and the pixel signal being sequentially input to the first capacitor from one predetermined pixel among the plurality of pixels during an analog signal processing time period, the second capacitor storing a difference between the pixel signal and the reset signal, the analog signal processing unit outputting a differential signal corresponding to the difference between the pixel signal and the reset signal;
    a delay circuit that includes a plurality of delay elements that are connected in a ring form, each of the plurality of delay elements delaying a pulse signal by a delay time corresponding to a level of the differential signal output from the analog signal processing unit;
    an A/D converter that detects the number of stages in which the pulse signal has propagated through the delay elements in the delay circuit during a sampling time period, the A/D converter generating a digital signal based on the detected number of stages; and
    a switching circuit that switches a connection of the first capacitor to cause the first capacitor to be connected between the one predetermined pixel and the second capacitor during the analog signal processing time period so that the reset signal and the pixel signal are sequentially input from the one predetermined pixel to the first capacitor and the difference between the pixel signal and the reset signal input to the first capacitor is input to the second capacitor, and to cause the first capacitor to be connected to a power supply terminal of each of the plurality of delay elements in the delay circuit during the sampling time period,
    wherein the analog signal processing unit, the delay circuit, the A/D converter, and the switching circuit are arranged for every one predetermined column or every a plurality of predetermined columns of the pixel unit, and
    each pixel of the one predetermined column or the plurality of predetermined columns in the pixel unit outputs the reset signal and the pixel signal to the corresponding one analog signal processing unit.

2. The solid state image pickup device according to claim 1, wherein the switching circuit switches a connection of terminals of the first capacitor, so that a high potential side terminal among the power supply terminals of the plurality of delay elements is connected to a high potential side terminal of the terminals of the first capacitor, and a low potential side terminal among the power supply terminals of the plurality of delay elements is connected to a low potential side terminal of the terminals of the first capacitor.

3. The solid state image pickup device according to claim 1, wherein
    the switching circuit connects the high potential side terminal of the first capacitor to a predetermined reference power voltage before the sampling time period starts, and
    the switching circuit causes the potential of the predetermined reference power voltage to be stored in the first capacitor before the sampling time period.

4. The solid state image pickup device according to claim 3, wherein the predetermined reference power voltage is a reference power voltage supplied to the analog signal processing unit.

5. The solid state image pickup device according to claim 2, wherein
    the switching circuit connects the high potential side terminal of the first capacitor to a predetermined reference power voltage before the sampling time period starts, and
    the switching circuit causes the potential of the predetermined reference power voltage to be stored in the first capacitor before the sampling time period.

6. The solid state image pickup device according to claim 5, wherein the predetermined reference power voltage is a reference power voltage supplied to the analog signal processing unit.

* * * * *